(12) United States Patent
Reinhardt et al.

(10) Patent No.: US 8,422,516 B2
(45) Date of Patent: Apr. 16, 2013

(54) SCALABLE DIGRF ARCHITECTURE

(75) Inventors: Steffen Reinhardt, Nuremberg (DE); Sharon Graif, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/999,837

(22) PCT Filed: Feb. 25, 2010

(86) PCT No.: PCT/EP2010/052407
§ 371 (c)(1),
(2), (4) Date: Feb. 14, 2011

(87) PCT Pub. No.: WO2011/103922
PCT Pub. Date: Sep. 1, 2011

(65) Prior Publication Data
US 2011/0206143 A1   Aug. 25, 2011

(51) Int. Cl.
*H04J 3/16* (2006.01)
*H04J 3/22* (2006.01)
*H04B 1/38* (2006.01)

(52) U.S. Cl.
USPC ............. 370/467; 370/469; 375/259; 455/73

(58) Field of Classification Search ............... None
See application file for complete search history.

(56) References Cited

U.S. PATENT DOCUMENTS

| | | | |
|---|---|---|---|
| 2004/0166823 A1 | 8/2004 | Alderton | |
| 2006/0223455 A1* | 10/2006 | Kerth | 455/76 |
| 2007/0268876 A1* | 11/2007 | Yellin et al. | 370/338 |
| 2009/0022177 A1* | 1/2009 | Schuster et al. | 370/468 |
| 2009/0122844 A1* | 5/2009 | Wenzel et al. | 375/219 |
| 2010/0074311 A1* | 3/2010 | Kopmeiners | 375/220 |
| 2010/0135275 A1* | 6/2010 | Storm et al. | 370/349 |
| 2011/0143688 A1* | 6/2011 | O'keeffe et al. | 455/73 |

FOREIGN PATENT DOCUMENTS
WO   WO 2009/019539 A1   2/2009

OTHER PUBLICATIONS

International Search Report (ISR) issued Oct. 26, 2010. Corresponding to International Application No. PCT/EP2010/052407.
Fogg, A. DIGRF Baseband / RF Digital Interface Specification. Internet Citation. Jan. 1, 2004. XP002325710.
Written Opinion of the International Searching Authority. Corresponding to International Application No.. PCT/EP2010/052407.
MIFI "Draft MIPI Alliance Specification for DigRF v4" Draft Version 0.7 r0.05, htt://wwww.mipi.org, May 7, 2009.
DIGRF "Dual-Mode 2.5G/3C Baseband/RFIC Interface Standard." Nov. 22, 2000. Version 3.09.

* cited by examiner

*Primary Examiner* — Marcus R Smith

(57) ABSTRACT

An embodiment of the invention provides a communication device (500, 800) which comprises a communication entity (502, 802) and a further communication entity (504, 804) communicatively coupled to the communication entity (502, 802) in accordance with a Digital Radio Frequency protocol. The communication entity (502, 802) comprises a protocol layer (516), the further communication entity (504, 804) comprises a protocol layer (514), and the protocol layers (516, 514) of the communication entity (502, 802) and of the further communication entity (504, 804) are connected via a protocol-physical interface (512, 513) which provides for a parallel bidirectional signal interfacing. The protocol-physical interface (512, 513) is adapted for selectively connecting the protocol layers (516, 514) directly or via physical layers (503, 508).

16 Claims, 5 Drawing Sheets

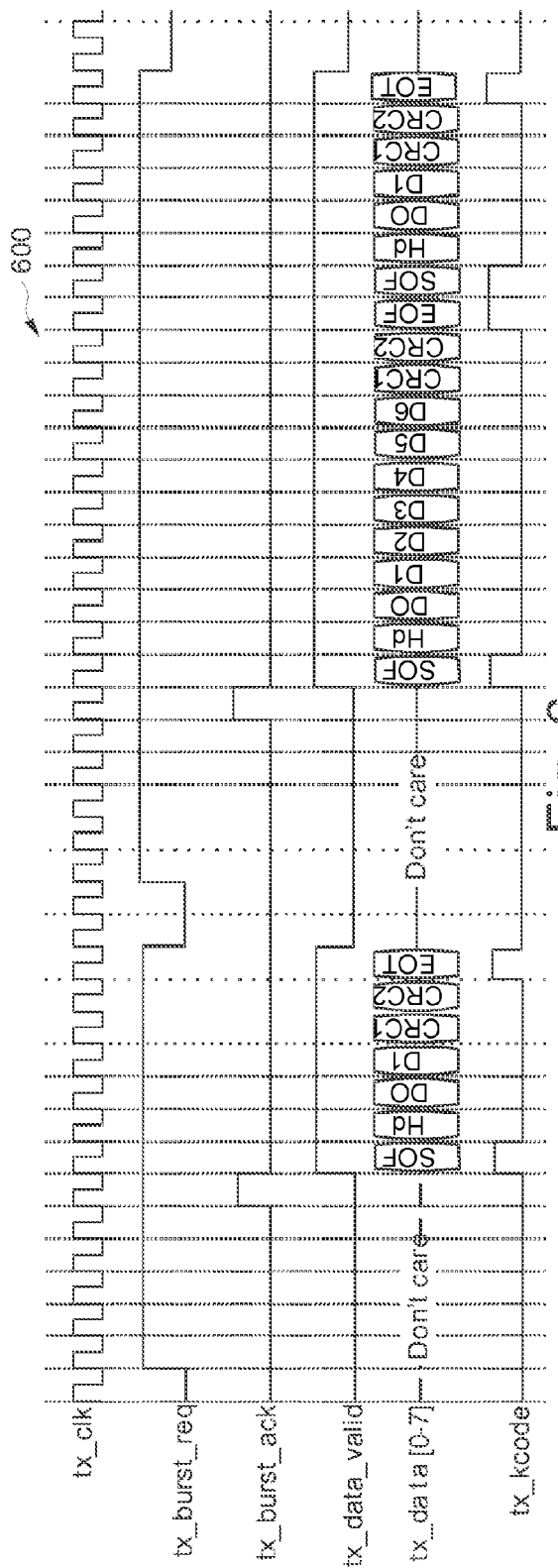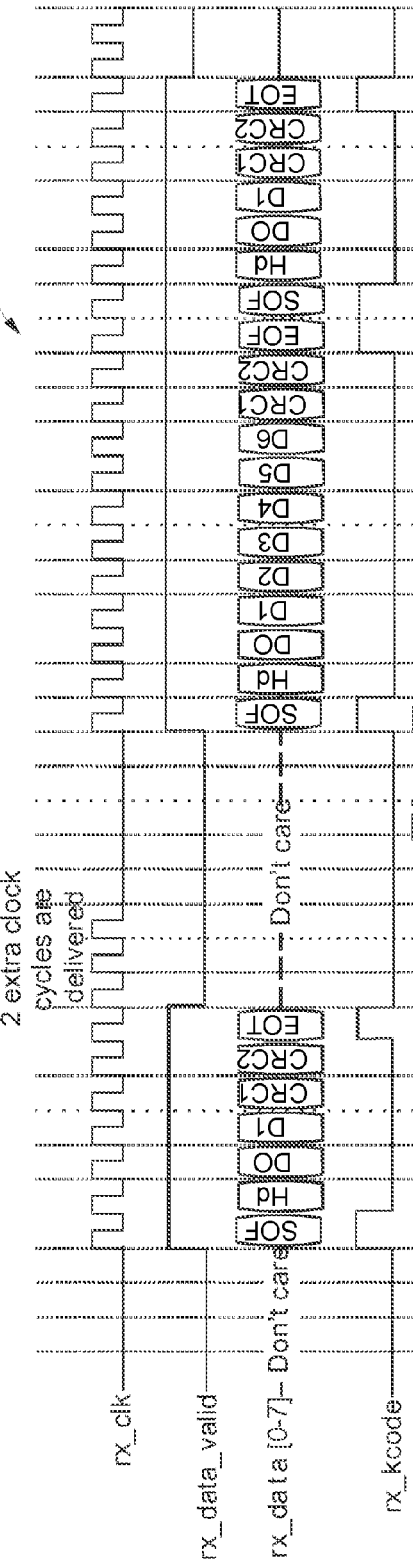

SCALABLE DIGRF ARCHITECTURE

TECHNICAL FIELD

The invention relates to a communication entity for a communication device.

Moreover, the invention relates to communication devices. The invention also relates to communication methods. Beyond this, the invention relates to program elements. The invention further relates to computer-readable media.

BACKGROUND

Terminals for the next generation, that are based on Radio Access technologies like Long Term Evolution (LTE) or WiMax are using digital interfaces between a radio frequency (RF) circuit and a baseband (BB) circuit, which are usually built as Application Specific Integrated Circuits (ASICs). This interface shall transport the user data as well as all required control information from/to BB ASIC to/from RF ASIC. It shall be formed by only a few lines and shall be robust against interference, emit itself as less interference as possible and it shall consume only low power.

A common standard for interfacing is the DigRF standard specified by the Mobile Industry Processor Interface (MIPI) Alliance. This standard is available in version v3.09—in the following called DigRF v3—and in version 4—in the following called DigRF v4.

The Digital Radio Frequency (DigRF) standard specifies a digital serial interface, which replaces the analog interface in previous generation mobile handset architectures. The DigRF standard supports a variety of air standards, e.g. as defined by the 3GPP, but not limited to those. The physical layer of DigRF standard connects a radio frequency integrated circuit (RFIC) and a base band integrated circuit (BBIC) via high speed serial links. Independent transmit (Tx) and receive (Rx) differential signal pairs allow for concurrent bi-directional communication between an RFIC and a BBIC.

Usually, RFIC and BBIC are provided in separate packages. However, it would be beneficial to provide RFIC and BBIC in a single package or even as a single chip solution to decrease pin count and printed circuit board (PCB) area.

DigRF v3 is the 3G capable version of the DigRF standard (DigRF, Dual-Mode 2.5G/3G baseband/RFIC interface standard, 22 Nov. 2006, version 3.09), which supports raw data rates up to 312 Mbit/s which is sufficient for Wideband Code Division Multiple Access (WCDMA) with Rx diversity. It has one serial Rx link and one serial Tx link.

The system clock (SysClk) can be 13, 26, 19.2 or 38.4 MHz. The nominal data rate is either SysClk/4 (low speed), SysClk (medium speed) or 312 Mbit/s (high speed). The high speed data clock of 312 MHz is derived from the system clock in the BBIC and RFIC.

DigRF v3 standard specifies a physical layer and a protocol layer.

The DigRF v3 physical layer has a serializer and a line driver in Tx direction and a synchronization unit as well as a line receiver and deserializer in Rx direction.

The data exchange on the protocol layer over the DigRF interface is organized by means of frames having a sync field, a header and the payload. The sync pattern is 16 bits and the header 8 bits long. The header contains the data type (data, control, etc.) and payload size. The payload size can be selected to be 8, 32, 64, 96, 128, 256, 512 bits. The payload can include I and Q data or control data.

DigRF v3 provides logical channels for IQ data and control of the radio parts to higher software layers. The use of these Logical Channels is not determined in the standard.

A DigRF v4 interface is divided in multiple layers (see MIPI Alliance Standard for DigRF v4, current version is V01.00.00, http://www.mipi.org). The lowest layer is the physical layer—in the following simply called PHY—that is based on the M-PHY, which is also standardized by the MIPI alliance and reused for several standards. It defines the analog electrical characteristics for the high speed serial transmission as well as an 8b10b coding stage for easing the clock data recovery (CDR). The next layer is the DigRF protocol layer which provides several logical channels towards the next higher layer. A logical channel is used to transmit messages with a payload up to 256 byte, which are mapped to frames and concatenated to bursts by the protocol layer. The protocol layer respectively a protocol layer extension cares additionally about error protection, error detection and error handling.

The next higher layer—called DigRF programming model—cares about how to use the logical channel and gives more abstract requirements how to handle the data and control flow between BBIC and RFIC. This layer was not included in former versions or releases of the standard and shall improve interoperability between different vendors.

The DigRF v4 offers much more features and flexibility in terms of different speeds, variable termination modes, variable length of synchronization sequence etc. as well as better reliability in terms of bit error rate compared to DigRF v3.

This causes on the other side an increased complexity of the interface itself in comparison to DigRF v3 and an increased effort in controlling and monitoring the interface. To provide also enough data rate for multiple-input multiple-output (MIMO) systems, the standard supports several parallel differential lines, which operate in parallel and which can be switched on/off dynamically.

The DigRF v4 is not backwards compliant and in some respects totally different from its predecessor DigRF v3. Differences for higher layers between the versions are the services provided by the protocol. Such differences include:

Defined logical channels and usage
Maximum payload sizes
Time Accurate Strobe (TAS) accuracy
TAS payload (interface control)

However, conventional DigRF systems have some shortcomings. In most platforms, either DigRF v3 or DigRF v4 is implemented. In a scalable architecture it makes sense to have also the DigRF version configurable either by a hardware option, which means that there are two designs one with DigRF v3 and one with DigRF v4, or by software options, what means both versions of the interface have to be physically available on the chip and one is selected by the software. In the case of hardware options, one of those can e.g. be selected in the production process e.g. by means of a fuse, as is commonly known to a person skilled in the art, or by a special selection pin which can, during operation, be set to 0 or 1 (resp. low or high level) to select one option.

That means in some configurations where for example only Global System for Mobile communication (GSM) or WCDMA is used, DigRF v3 may be sufficient, and in a configuration with high demands on data rates DigRF v4 can be deployed. The DigRF v3 is simpler and needs less area for implementation. Also the DigRFv3 has less power consumption as its successor.

In both DigRF versions the area and power consumption is mainly dominated by the physical layer.

In case BBIC and RFIC are integrated in the same package or even on the same die, DigRF loses its main advantages namely to provide a high data rate interface on a minimum pin count. When integrated in such a way, the limiting factor is not the pin count, but rather power consumption. The latter is, however, not addressed by DigRF.

Thus, conventional DigRF technology may lack sufficient flexibility.

SUMMARY

It is an object of the invention to provide a Digital Radio Frequency system providing sufficient flexibility for a user.

In order to achieve the object defined above, a communication entity, communication devices, communication methods, program elements, and computer-readable media according to the independent claims are provided.

According to an exemplary embodiment of a first aspect of the invention, a communication entity is provided for communicating with a further communication entity selectively (i.e. alternatively or in parallel) in accordance with a first version of a Digital Radio Frequency protocol or in accordance with a second version of the Digital Radio Frequency protocol. The communication entity may comprise a first layer sequence adapted for communicating in accordance with the first version of the Digital Radio Frequency protocol, and a second layer sequence adapted for communicating in accordance with the second version of the Digital Radio Frequency protocol. A compliance layer may be provided above the first layer sequence, may be coupled to the second layer sequence, and may be adapted for at least partially compensating for differences between the first version and the second version.

According to another exemplary embodiment of the first aspect of the invention, a communication device is provided which comprises a communication entity having the above mentioned features, and the further communication entity communicatively coupled to the communication entity.

According to still another exemplary embodiment of the first aspect of the invention, a method of communicating (particularly of exchanging data) between a communication entity and a further communication entity selectively in accordance with a first version of a Digital Radio Frequency protocol or in accordance with a second version of the Digital Radio Frequency protocol is provided. The method comprises communicating in accordance with the first version of the Digital Radio Frequency protocol by a first layer sequence of the communication entity, or communicating in accordance with the second version of the Digital Radio Frequency protocol by a second layer sequence of the communication entity. The method further comprises at least partially compensating for differences between the first version and the second version by a compliance layer of the communication entity above the first layer sequence and coupled to the second layer sequence.

According to an exemplary embodiment of a second aspect of the invention, a communication device is provided which comprises a communication entity and a further communication entity communicatively coupled to the communication entity in accordance with a Digital Radio Frequency protocol. The communication entity comprises a protocol layer, the further communication entity comprises a protocol layer, and the protocol layers of the communication entity and of the further communication entity are connected via a protocol-physical interface which provides for a parallel bidirectional signal interfacing. The protocol-physical interface is adapted for selectively connecting the protocol layers directly or via physical layers (which may or may not be provided in the communication entity and/or the further communication entity).

According to another exemplary embodiment of the second aspect of the invention, a communication method is provided which comprises communicatively coupling a communication entity to a further communication entity in accordance with a Digital Radio Frequency protocol. The method further comprises connecting a protocol layer of the communication entity and a protocol layer of the further communication entity via a protocol-physical interface which provides for a parallel bidirectional signal interfacing. The protocol-physical interface is adapted for selectively connecting the protocol layers directly or via physical layers.

According to still another exemplary embodiment of the invention, a program element (for instance a software routine, in source code or in executable code) is provided, which, when being executed by a processor (such as a microprocessor), is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "communication device" may particularly denote a transmitter device, a receiver device or a transmitter/receiver device (transceiver) which allows for a unidirectional or bidirectional exchange of communication messages with a communication partner. Such a communication device may particularly be a wireless communication device, i.e. a communication device which communicates without the necessity of wires. However, wire-based communication is also possible in other embodiments. An example of a communication device is a mobile phone.

The term "communication entity" may particularly denote a hardware, software or hybrid entity controlling or contributing a part of the operation of the communication device. In an embodiment, such a communication entity may be an integrated circuit such as a base band integrated circuit. Such a control entity may be configured as an electronic chip (such as an ASIC) or as a conventionally wired circuit.

The term "version of the Digital Radio Frequency protocol" may particularly denote a specific version of the DigRF standard. The communication entity may be adapted for communicating in accordance with at least two different versions of DigRF, for instance a Digital Radio Frequency protocol Version 3 or Version 4. It is clear that any other already existing or future version of this protocol may be used as well. A preferred embodiment relates to a DigRF v4 implementation which is also capable of supporting a DigRF v3 implementation.

The term "layer sequence" may particularly denote different logic processes which may be arranged as different hierarchic levels in a communication entity. Higher layers may relate to more sophisticated control purposes in contrast to lower layers which may be closer related to a physical transmission of data. In DigRF standards, a plurality of layers can be provided, such as physical layer, protocol layer and programming model layer. However, additional layers are possible, particularly above the programming model layer. One or more of these layers may also be omitted. Each layer may perform certain dedicated tasks to manage information between a sender and a receiver.

The term "parallel bidirectional signal interfacing" may particularly denote an interface performance which has a plurality of parallel signal lines capable of transporting several signals in parallel. Such a signal transport may be performed in a first transport direction and in a second transport direction opposing the first transport direction.

The term "selectively" doing one thing or another may particularly denote that a corresponding unit has the capability or functionality to do the one thing or to do the other thing, as requested or required in a specific scenario. Thus, a corresponding unit has the flexibility to support both things.

According to an exemplary embodiment of the first aspect of the invention, a communication architecture is provided which allows for communicating with at least two different versions of a Digital Radio Frequency protocol. For instance, the different versions may be a former version and a successor version. The former version usually provides a lower level of functionality as compared to a higher level of functionality provided by the successor version. According to an exemplary embodiment, a communication entity is provided which supports the flexible use of both versions even if the second version is not downward compatible with the first version. To achieve a compatibility of the two versions, a compliance layer is arranged in the communication architecture which can adjust characteristics of signals propagating between various layers and various layer sequences in such a manner that layers above the compliance layer do not see any difference or at least see basically no difference between both versions. Such a compliance layer may also bridge different layers even of different layer sequences to achieve compatibility.

According to an exemplary embodiment of the second aspect of the invention, a communication architecture is provided which implements a protocol-physical interface as a parallel data interface operating in two opposite signal transmission directions. This protocol-physical interface is specifically designed to allow for a connection of the protocol layers of both communication entities directly, i.e. without any physical layer of such communication entities in between. Making use of such an option allows omitting hardware related to physical layers thereby allowing for a very compact and power-saving design of the communication device. However, the interface is also configured in such a way to support also a device design in which physical layers of the communication entities are arranged in between the protocol layers. Hence, the provision of such a protocol-physical interface allows a hardware designer to flexibly decide whether or not physical layers shall be provided in a layer sequence of the communication entities.

Next, further exemplary embodiments of the communication entity according to the first aspect will be explained. However, these embodiments also apply to the communication device according to the first aspect, to the method according to the first aspect, to the program element according to the first aspect and to the computer-readable medium according to the first aspect.

The second version may be a successor version to the first version. In other words, the second version may relate to a more recent technology generation as compared to a former technology generation of the first version.

In an embodiment, the compliance layer may be adapted to provide a logical interface to a programming model layer of the second layer sequence. This logical interface may be identical or equivalent to an interface between a protocol layer and the programming model layer of the second layer sequence. Particularly, the compliance layer may provide a logical interface between a protocol layer of the first layer sequence and the programming model layer of the second layer sequence being equivalent to the interface between the protocol layer of the second layer sequence and the programming model layer of the second layer sequence. This may allow to hide a used protocol version from higher layers by balancing differences between both protocol versions.

According to an exemplary embodiment, the compliance layer may be adapted to map signals propagating from at least one upper layer of the second layer sequence via the compliance layer towards the first layer sequence so that the mapped signals appear to the first layer sequence as signals in accordance with the first version. Thus, a compensation, a mapping or mimicking may be performed by the compliance layer so as to make it possible that layers operating in accordance with the second version of the protocol cooperate with layers which are actually provided for operation in accordance with the first version.

According to an exemplary embodiment, the compliance layer may be adapted to provide logical channels to a programming model layer of the second layer sequence which logical channels are equivalent to logical channels provided by a protocol layer of the second layer sequence. Particularly, the logical channels provided by the compliance layer may be equivalent to logical channels provided by a protocol layer of DigRF v4 when it forms the second version. In other words, a compliance layer operating in accordance with DigRF v3 may offer logical channels to higher layers which are equivalent to the DigRF v4 logical channels. Conventionally, the protocol layer is responsible in DigRF v4 for offering such logical channels, whereas a protocol layer in DigRF v3 does usually not offer such logical channels. Hence, this gap may be closed by providing a corresponding functionality by the compliance layer.

In an embodiment, the compliance layer may be adapted to adjust a frame length of signals propagating from the second layer sequence via the compliance layer to the first layer sequence to render the frame length compatible with the first version. Particularly, the compliance layer may be adapted to adjust an outgoing frame length of signals propagating from the second layer sequence via the compliance layer to the first layer sequence if an incoming frame length is not supported by the first version. Different versions of the digital radio frequency protocol may support different frame lengths of a payload. In such a scenario, it may happen that for instance DigRF v4 provides a frame length which does not meet requirements of DigRF v3. In such a scenario, the compliance layer may manipulate an incoming frame length of signals for providing an outgoing frame length which is compatible with the first version as well. In other words, the compliance layer may adjust a payload frame length to compensate for differences in supported payload frame lengths between DigRF v3 and DigRF v4.

Still referring to the previously described embodiment, the compliance layer may be adapted to adjust the frame length by adding one or more fill bits to the signal to extend the frame length to a length which is compatible with the first version. Hence, the adjusting of the outgoing frame length may comprise adding one or more fill bits to the signal to extend the frame length to a length supported by the first version. For instance, if a frame length according to DigRF v4 is 40 bits and this frame length is not supported by the first version, 24 fill bits may be attached to the end of the 40 bit sequence to obtain a 64 bit sequence which is then also supported by the first version. For example, such fill bits may be empty bits (for example simply adding zeros or ones). Particularly, it is possible to adjust the payload frame length supported by the second version but not by the first version by adding fill bits until the next larger payload frame length supported by the first version is obtained.

Still referring to the previously described embodiment, the compliance layer may be adapted to add information to a header of the signal indicative of a number of added fill bits. More precisely, the adjusting of the outgoing frame length may comprise adding information to a header of the signal indicative of a number of added fill bits. Using this information at a receiver side may then allow to delete the fill bits for recovering the signal content. Coming back to the previously described example, if an information indicating that 24 fill bits have been added at the end of the payload is added to the header, this information may allow at the receiver side to derive the information where to cut off the sequence to remove the fill bits. As an alternative to the adding of this information to the header, it is simply possible that the receiver side detects the length of the fill bits at the end of the extended signal.

In an embodiment, the compliance layer may be adapted to segment a signal propagating from the second layer sequence via the compliance layer to the first layer sequence into a plurality of separate frames to render a frame length compatible with a maximum frame length supported by the first version. Hence, the compliance layer may segment the incoming signal into multiple segmented sections as outgoing frames if the initial signal has a frame length which exceeds a maximum frame length supported by the first version. Taking this measure may be advantageous in the case of different maximum frame sizes in different versions of the protocol. For instance, it may happen that the first version does not support frames longer than a predefined maximum bit number. In such a case, the frame may be segmented into a plurality of sections which can then be transmitted separately so as to meet the maximum length requirements of the first version, for instance. Segmentation may be indicated to a receiver side by including corresponding information in a header. However, taking such measures may be dispensable in some embodiments.

According to an exemplary embodiment, the compliance layer may be adapted to, in the event of a TAS request, delay a transmission of a TAS message by a time interval which is equal to a transmission time of a frame having a predefined maximum frame length. The delay may also be larger than such a maximum transmission time. The compliance layer may therefore be configured to, in the event of a TAS request, wait for a maximum supported payload frame length before transmitting the TAS message. During this waiting time, the compliance layer may block all other requests to assure that the physical transmission medium is free after expiry of the waiting time. The compliance layer can then transmit the TAS message.

According to an exemplary embodiment, the first layer sequence may comprise a physical layer and a protocol layer as well as a protocol-physical interface (PPI) arranged between the physical layer and the protocol layer. Additionally or alternatively, the second layer sequence may also comprise a physical layer, a protocol layer and a protocol-physical interface arranged between the physical layer and the protocol layer. Such a protocol-physical interface can provide for a common parallel bidirectional signal interfacing for both versions of the Digital Radio Frequency protocol or standard. This means that a number of parallel channels may be provided by the protocol-physical interface coupling the protocol layer to the physical layer. The protocol-physical interface may allow for a data transmission in a transmission direction and in an oppositely oriented reception direction. The corresponding interface may also be configurable to meet user preferences.

In an embodiment, the communication entity may be a radio frequency integrated circuit (RFIC). It is also possible, that the communication entity is adapted as a base band integrated circuit (BBIC). Also both a radio frequency integrated circuit and a base band integrated circuit of a communication device may be provided with the corresponding measures. By making an RFIC and/or a BBIC selectively operable with different versions of a Digital Radio Frequency protocol, the flexibility and interoperability of different RFICs and BBICs can be significantly improved.

For example, the first version of the Digital Radio Frequency protocol may be DigRF v3, whereas the second version of the Digital Radio Frequency protocol may be DigRF v4. Since DigRF v4 is not downwards compatible to DigRF v3, the provision of a compliance layer can allow to nevertheless make it possible to provide a communication entity operable with any one of DigRF v3 or DigRF v4.

Next, further exemplary embodiments of the communication device according to the first aspect will be explained. However, these embodiments also apply to the communication entity according to the first aspect, to the method according to the first aspect, to the program element according to the first aspect and to the computer-readable medium according to the first aspect.

The further communication entity may or may not have a similar or identical constitution as the communication entity. It may support one or more versions of DigRF.

The communication entity may be a radio frequency integrated circuit (RFIC), and the further communication entity may be a base band integrated circuit (BBIC). The BBIC may support the second version but not the first version of the Digital Radio Frequency protocol. Thus, an RFIC may be equipped with the functionality to operate with different DigRF versions allowing to obtain a very flexible system. This RFIC may then cooperate with a BBIC even if the BBIC is only capable of supporting the second version but not the first version.

Alternatively, the communication entity may be a radio frequency integrated circuit, and the further communication entity may be a base band integrated circuit supporting the first version but not the second version of the Digital Radio Frequency protocol. In this embodiment, it is advantageous that the base band integrated circuit also has a compliance layer with the above-mentioned features, particularly being adapted for at least partially compensating for differences between the first version and the second version.

The communication device may further comprise a transmitter unit adapted for transmitting a communication message to a communication partner device and may comprise a receiver unit adapted for receiving a communication message from a communication partner device. The transmission unit may be a transmission antenna. The receiver unit may be a receiver antenna. It is also possible that transmitter antenna and receiver antenna are combined to a single common transceiver antenna.

The communication device may be adapted for wireless communication or wired communication. More particularly, the communication device may be adapted for wireless communication with a communication partner device. For example, communication between two mobile phones is possible, or communication between a mobile phone and a base station.

The communication device may be a mobile communication device, a portable communication device (i.e. a communication device which can be carried by a user during normal operation), a mobile terminal, a mobile phone, a data card, a Personal Digital Assistant (PDA), a telecommunications device, or a laptop. Any communication device may be used according to exemplary embodiments, although particular advantages may be obtained in the field of telecommunication, more particularly of cellular phones.

The communication device may be adapted for communicating with a communication partner device in accordance with a Long-Term Evolution (LTE) protocol or a WiMax protocol. However, other protocols may be implemented as well.

Next, further exemplary embodiments of the communication device according to the second aspect will be explained. However, these embodiments also apply to the method according to the second aspect, to the program element according to the second aspect and to the computer-readable medium according to the second aspect.

In an embodiment, the protocol-physical interface may comprise handshake signal lines adapted for transporting handshake signals capable of selectively connecting the protocol layers directly or via physical layers. A "handshake signal" may denote a signal relating to a process of negotiation between communicatively coupled units that dynamically sets parameters of a communications channel established between the two units before normal communication over the channel begins. "Handshaking" may also denote an exchange of predetermined signals for purposes of control when a connection is established between two communicatively coupled units.

In an embodiment, the handshake signal lines may be adapted for transporting a first handshake signal and a second handshake signal (in a data transmission direction) downstream of the first handshake signal which are indicative of a timing of a frame to be transmitted. Thus, such handshake signals may indicate when a next frame carrying data is to be expected. In a direct coupling of protocol layers, corresponding handshake signal lines may be serially connected to one another, whereas they may be separated from one another when each protocol layer communicates with a dedicated physical layer.

In an embodiment, the handshake signal lines may be adapted for transporting a third handshake signal indicative of a burst request and a fourth handshake signal in opposite direction and indicative of an acknowledgement of a burst. Such handshake signals may manage a timing of bursts. In a direct coupling of protocol layers, corresponding handshake signal lines may be short-circuited, whereas they may be arranged antiparallel to one another when each protocol layer communicates with a dedicated physical layer. A burst-mode may relate to a scenario in which a communication unit is transmitting data repeatedly without waiting for input from another communication unit or waiting for an internal process to terminate before continuing the transfer of data.

In an embodiment, the communication entity and the further communication entity may be free of physical layers. Hence, the protocol layers of the communication entity and of the further communication entity may be directly connected to one another via the protocol-physical interface. The protocol-physical interface may also provide a common clock signal for the communication entity and the further communication entity. Thus, the communication entity and the further communication entity may be coupled without the necessity to provide physical layers for the two communication entities. Therefore, it is possible to manufacture the arrangement of communication entity and further communication entity with a very small space requirement and with a low size since a physical layer conventionally has a large space requirement. It is then for instance possible that the communication entity and the further communication entity are also provided on the same semiconductor chip or die which allows to further save space. However, also two different dice are possible for implementing the communication entity and the further communication entity. In an embodiment, the communication entity and the further communication entity may be separate dice housed in a common package. In other words, the communication entity and the further communication entity may share a common package. Therefore, the package for housing the semiconductor chip or chips which include the communication entity and the further communication entity may be the same. The communication entity and the further communication entity may be provided as two separate semiconductor chips, i.e. naked dice, or as a common single semiconductor chip. In both cases, the omission of physical layers may reduce the length of signal paths, may reduce the size of the communication device and may provide for a compact design.

In the previously described embodiments in which physical layers are omitted, each of the communication entity and the further communication entity may comprise a layer sequence having a protocol layer as lowest layer.

In an embodiment, the communication entity and the further communication entity may be coupled to a common reference clock. When a physical layer is omitted due to a direct coupling of the protocol layers, the provision of a clock signal may be a function provided by the protocol-physical interface as well, which may involve using an external clock source.

In another embodiment, the communication entity may comprise a physical layer, the further communication entity may comprise a physical layer, and the protocol layers of the communication entities may be connected via a protocol-physical interface to a respective one of the physical layers. Thus, with basically the same protocol-physical interface as in case of a direct coupling of protocol layers without physical layers, also the coupling of protocol layers by physical layers is supported allowing for a universal deployment of such a protocol-physical interface.

In an embodiment, the protocol-physical interface may comprise one or more of the following lines (once or redundantly):

a clock line adapted for providing a clock signal;
a plurality of data word transmission lines adapted for transmitting data words;
a code indication line adapted for providing a signal indicative of a code type of a data word;
a burst request line adapted for requesting a burst from a coupled layer.

Note that, for an actual implementation, more lines than the ones mentioned above may be provided.

In an embodiment, the protocol-physical interface may comprise a configuration interface. This may allow a user to flexibly adjust the protocol-physical interface and/or the physical layer to preferences in accordance with a specific application.

In an embodiment, the communication entity may comprise a radio frequency integrated circuit (RFIC). The further communication entity may comprise a base band integrated circuit (BBIC). Interoperability of such two ICs which may originate from different manufacturers may be supported by the flexibility of the protocol-physical interface.

Of course, some embodiments as described above may also be combined; particularly, the embodiments of the above-mentioned first aspect of the invention may be combined with embodiments of the above-mentioned second aspect of the invention.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

FIG. 6 illustrates signals transmitted via a Tx lane interface of the embodiment of FIG. 5.

FIG. 7 illustrates signals transmitted via an Rx lane interface of the embodiment of FIG. 5.

DETAILED DESCRIPTION

Figure 1:
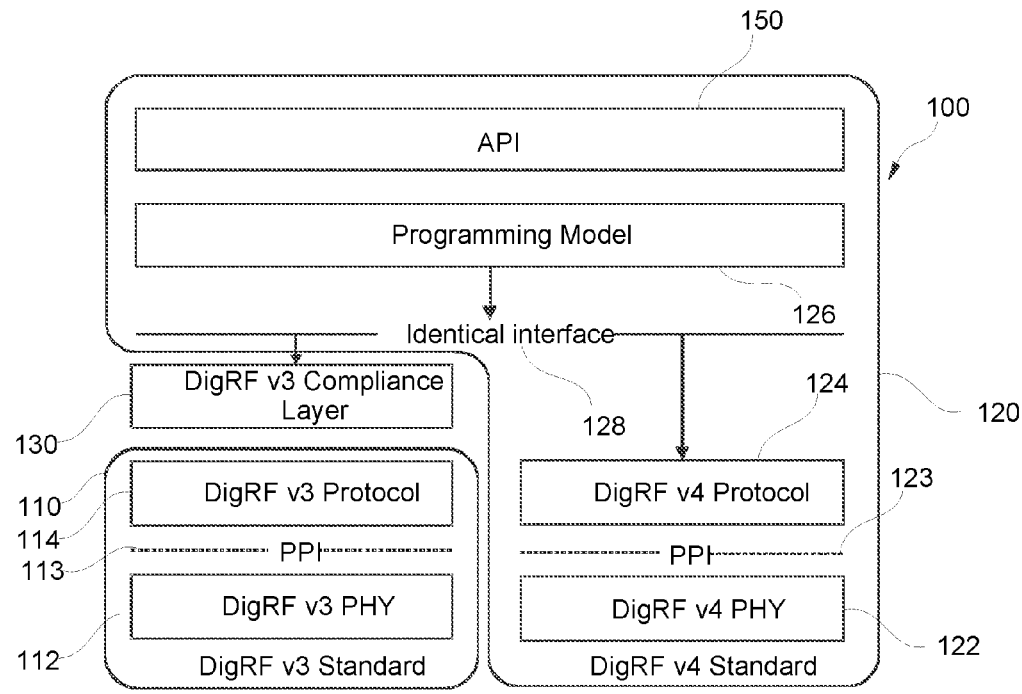
FIG. 1 illustrates a communication entity according to an exemplary embodiment of the first aspect which has implemented a compliance layer.

The illustration in the drawing is schematically. In different drawings, similar or identical elements are provided with the same reference signs.

A gist of an embodiment of the invention is to construct a scalable architecture with respect to DigRF, which can operate with different versions of DigRF (particularly with both DigRF v3 and DigRF v4) with no significant software changes and can also be scaled down to a simple parallel interface in case that RFIC and BBIC are integrated in the same package.

An advantageous architecture according to an exemplary embodiment comprises:
 a compliance layer above DigRF v3 and/or
 a well-defined parallel interface between DigRF v3/v4 protocol and DigRF v3/v4 physical layer (PPI: Protocol-PHY interface).

The compliance layer may be a very simple layer on top of the DigRF v3 protocol layer which provides a logical interface identical to that one of DigRF v4 (compare FIG. 1 described below). An advantage of such a design is that other hardware or software layers above the DigRF v3 compliance layer do not see any difference between both versions of the interface besides the different capabilities regarding the data rate. Hence, an advantage is that the used DigRF version gets transparent for higher layer software and radio management software, which makes only one software branch necessary. Also the data flow can be handled independently of the used DigRF version.

The protocol-physical layer interface (PPI) can be defined in a way that it is easily possible to cut away the physical layers in BBIC and RFIC and connect the protocol layers directly. i.e. without physical layers in between. This can be used in case RFIC and BBIC are integrated in same package, where the pin count is not affected. This may result in a significant safe in area and power consumption.

DigRF v3 and DigRF v4 can be used in parallel. There is no difference whether commands are sent over DigRF v3 and DigRF v4. A DigRF interface can be scaled down to a simple and small parallel interface in case of a single package solution with no effect on software and hardware.

FIG. 1 illustrates a radio frequency integrated circuit (RFIC) 100 as an example for a communication entity for communicating with a base band integrated circuit (BBIC, not shown in FIG. 1) as a further communication entity according to an exemplary embodiment of the first aspect of the invention.

The RFIC 100 is capable of communicating with the BBIC in accordance with DigRF v3 or DigRF v4. For enabling this functionality, the following layer architecture is implemented in the RFIC 100:

The RFIC 100 comprises a first layer sequence 110 adapted for communicating in accordance with DigRF v3. The first layer sequence 110 comprises a physical layer 112 and a protocol layer 114. Between the physical layer 112 and the protocol layer 114, a physical-protocol layer interface 113 is sandwiched, as will be explained below in more detail.

Furthermore, a second layer sequence 120 is provided which is adapted for communicating in accordance with DigRF v4. The second layer sequence 120 comprises a physical layer 122, a protocol layer 124, and a programming model layer 126. A physical-protocol layer interface 123 is arranged between the physical layer 122 and the protocol layer 124. Moreover, the RFIC 100 comprises an application program interface (API) block 150 in the second layer sequence 120. All the layers within the second layer sequence 120 are configured for operation in accordance with DigRF v4.

Moreover, a compliance layer 130 is provided above the first layer sequence 110, and coupled to the second layer sequence 120 below the programming model layer 126. More specifically, the compliance layer 130 is coupled via an interface 128 to the programming model layer 126 of the second layer sequence 120. The compliance layer 130 is adapted for compensating for differences between DigRF v3 and DigRF v4.

Particularly, the compliance layer 130 provides a logical interface 128 to the programming model layer 126 which is identical to an interface between protocol layer 124 and programming model layer 126 of the second layer sequence 120. As will be explained below in more detail, the compliance layer 130 may map signals propagating from the programming model layer 126 via the compliance layer 130 to the protocol layer 114 so that the mapped signals appear as signals in accordance with the DigRF v3 standard. The compliance layer 130 may further provide logical channels to the programming model layer 126 equivalent to logical channels provided by a protocol layer 124 of DigRF v4. Thus, the compliance layer 130 may convert signals propagating between the upper programming model layer 126 of the second layer sequence 120 and the protocol layer 114 of the first layer sequence 110 to provide compatibility between the different versions of the standard. Operation of the compliance layer 130 may also include adaptation of frame lengths in terms of, if required, adding fill bits to frame lengths which are not supported by DigRF v3, segmenting frames which are too large for DigRF v3, etc. Operation of the compliance layer 130 may also include adding information to a header of signals transmitted between the second layer sequence 120 and the first layer sequence 110 indicating extension of frames by fill bits, segmentation of frames into different sections, etc. Also the handling of TAS communication may be managed by the compliance layer 130, as will be explained below.

Of course, also a base band integrated circuit (BBIC) may comprise the layer architecture as illustrated with reference to FIG. 1 for the example of a RFIC, and may particularly comprise a compliance layer 130 as described above.

Figure 2:
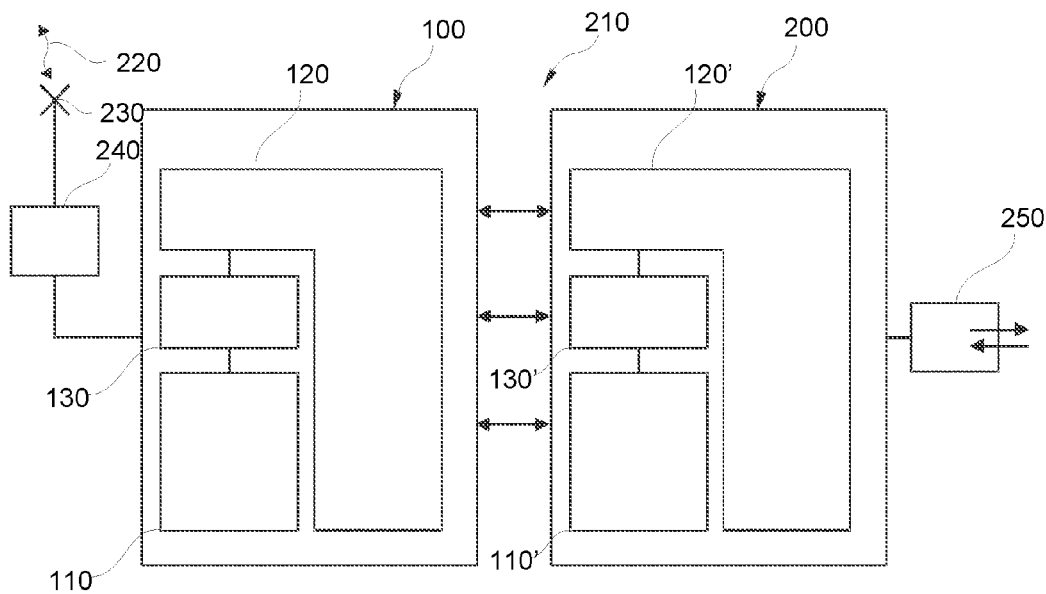
FIG. 2 illustrates a communication device of two communicatively coupled communication entities according to an exemplary embodiment of the first aspect.

FIG. 2 illustrates a mobile phone 210 as an example for a communication device according to an exemplary embodiment of the first aspect of the invention.

The mobile phone 210 (not all components are shown in FIG. 2) comprises a BBIC 200 as a further communication entity. The BBIC 200 may be capable of communicating with the RFIC 100 using the layer sequences 110, 120, 130 of the RFIC 100 and correspondingly the sequences 110', 120', 130' of the BBIC 200. During operation of the mobile phone 210, a wireless transmission of electromagnetic radiation 220 takes place between a communication partner device (such as another mobile phone or a base station, not shown) and a transceiver antenna 230 of the mobile phone 210. When the transceiver antenna 230 has received an electromagnetic radiation signal 220, it may be forwarded to a pre-processing unit 240 and subsequently to the RFIC 100 for analog-to-digital conversion and for base band transformation. The processed signal may then be supplied to the BBIC 200 for further signal processing.

The scalable architecture according to embodiments of the invention (see for instance FIG. 1 and FIG. 2) may include at least one of two key components, namely the compliance layer 130 (or 130') and the protocol-PHY-interface 113, 123 which will be explained in more detail in the following sections.

To hide the used protocol version from higher layers the DigRF v3 compliance layer 130 may be introduced. The compliance layer 130 shall hide differences (such as defined logical channels and usage, maximum payload sizes, TAS accuracy, TAS payload) between both protocol versions. In the following sections it is explained in detail for each difference how that will work.

A DigRF v3 compliance layer 130 may offer certain logical channels to higher layers which are equivalent to the DigRF v4 logical channels. These logical channels of the compliance layer 130 may then be mapped to DigRF v3 logical channels.

The compliance layer 130 may be an additional layer above the DigRF v3 protocol and shall not affect the standard compliance of DigRF v3.

The first byte of an RFIC control logical channel frame is interpreted as extended header, whereas the two most significant bits (msbs) are used to separate several sub-channels:

| | |
|---|---|
| 00xxxxxxb | Configuration Write Control LC: Equivalent format as DigRF v4 CWCLC |
| 01xxxxxxb | Configuration Read Control LC: Equivalent format as DigRF v4 CRCLC |
| 10xxxxxxb | Tx High Level Control LC |
| 11xxxxxxb | Tx Sub Control LC |

With the above definitions the following mapping of DigRF v3 and DigRF v4 CLCs for Tx direction results:

TABLE 1

Control Logical Channel Mapping for Tx

| Common Stratum LC | DigRF v4 LC | DigRF v3 LC |
|---|---|---|
| Tx Interface Control LC | Tx Interface Control LC | Interface Control LC (0000b) |
| Time Accurate Strobe LC | Time Accurate Strobe LC (8 bit) | Time Accurate Strobe Message LC (0001b) |
| Control Write Control LC | Control Write Control LC | RFIC Control LC (0010b) + 3 msbs of payload set to 010b |
| Control Read Control LC | Control Read Control LC | RFIC Control LC (0010b) + 3 msbs of payload set to 011b |
| Tx High Level Control LC | Tx High Level Control LC | RFIC Control LC (0010b) + 3 msbs of payload set to 101b |
| Tx Sub Control LC | Tx Sub Control LC | RFIC Control LC (0010b) + 3 msbs of payload set to 111b |

A similar mapping may be done for the RFIC Unsolicited Status LC. The first byte is set to one of the following values dependent on used Common Stratum Logical Channel:

| | |
|---|---|
| 01xxxxxxb | Rx Information Control LC: Equivalent format as DigRF v4 RBCLC |
| 10xxxxxxb | Rx High Level Control LC |
| 11xxxxxxb | Rx Sub Control LC |

With the above definitions the following mapping of DigRF v3 and DigRF v4 CLCs for Rx direction results:

TABLE 2

Control Logical Channel Mapping for Rx

| DigRF v4 LC | Compliance Layer LC | DigRF v3 LC |
|---|---|---|
| Rx Interface Control LC | Rx Interface Control LC | Interface Control LC (0000b) |
| Rx Information Control LC | Rx Information Control LC | RFIC Unsolicited Status LC (0001b) + 3 msbs of payload set to 101b |
| Read Back Control LC | Read Back Control LC | RFIC Read LC (0010b) |
| Tx High Level Control LC | Tx High Level Control LC | RFIC Unsolicited Status LC (0001b) + 3 msbs of payload set to 101b |
| Tx Sub Control LC | Tx Sub Control LC | RFIC Unsolicited Status LC (0001b) + 3 msbs of payload set to 111b |

The data logical channel mapping for Rx and Tx is given in the following table. Due to the fact that the data formats for WCDMA and GSM do not differ and the HUGE format defined for EDGE2 (Enhanced Data rates for Global Evolution) can easily be mapped to a DigRFv3 DLC (Data Logical Channel) there is no special handling needed for DLC.

TABLE 3

Data Logical Channel Mapping for Rx and Tx

| Common Stratum LC | DigRF v4 LC | DigRF v3 LC |
|---|---|---|
| Data LC 0 | Data LC 0 | Data Channel A |
| Data LC 1 | Data LC 1 | Data Channel B |
| Data LC 2 | Data LC 2 | Data Channel C |

TABLE 3-continued

Data Logical Channel Mapping for Rx and Tx

| Common Stratum LC | DigRF v4 LC | DigRF v3 LC |
|---|---|---|
| Data LC 3 | Data LC 3 | Data Channel D |
| Data LC 4 | Data LC 4 | Data Channel E |
| Data LC 5 | Data LC 5 | Data Channel F |
| Data LC 6 | Data LC 6 | Data Channel G |
| Sub Data LC | Sub Data LC | Data Channel H |

The data format for WCDMA and GSM is not affected.

With regard to payload sizes, the DigRF v4 supports all frame lengths that are a multiple of 8 bit, whereas the DigRF v3 supports only 8, 16, 32, 64, 128, 256 and 512 bits.

With regard to Data Logical Channel, no data format defined in DigRF v4 is longer than 512 bits, so no special handling is needed here. If a frame length is not supported the frame may be filled/fpadded with zeros until the next valid frame length is obtained. Due to the fact that the BBIC will anyway configure the data format the compliance layer 130 can cut away non used bytes easily.

With regard to Control Logical Channels, payload problems occur on logical channels mapped to the RFIC Control Logical Channel. It will be apparent from the following that the invention provides a solution to such problems, i.e. facilitates handling of payload in such channels.

For channels mapped to the RFIC Control Logical Channel using a frame length in between those defined by the DigRF v3 protocol, the frame may be filled up with zeros until matching a defined frame length.

For CWCLC (Control Write Control Logical Channel) and CRCLC (Control Read Control Logical Channel) the size is fixed and definitely smaller than 512-8 bit. Optional fill bits can be easily removed on the receive side. A second option would be to include the number of filled bytes in the extended header (with a length of 5 bits).

For THLCLC (Transmit High Level Control Logical Channel) and TSCLC (Transmit Sub Control Logical Channel) the length is included in the first byte of the payload, but a second problem may occur: The size can be larger than 512-8 bit.

One solution for solving the problem with the different maximum payload sizes is to restrict the used payload size for both interface version to 512-8 (maximum DigRFv3 frame length—extended header) bit.

In order to fully support the DigRF v4, the compliance layer 130 can segment frames from higher layers that are longer than 512-8 bit. Therefore the extended header can be used again to indicate whether segmentation is used and which segment is presently transferred. This is only needed for the THLCLC and TSCLC.

With regard to TAS accuracy and now referring to FIG. 3, handling of TAS messages according to the first aspect of the invention will be explained. To realize a comparable accuracy of the TAS message 320, the following procedure may be introduced by the compliance layer 130 as shown in FIG. 3.

Figure 3:
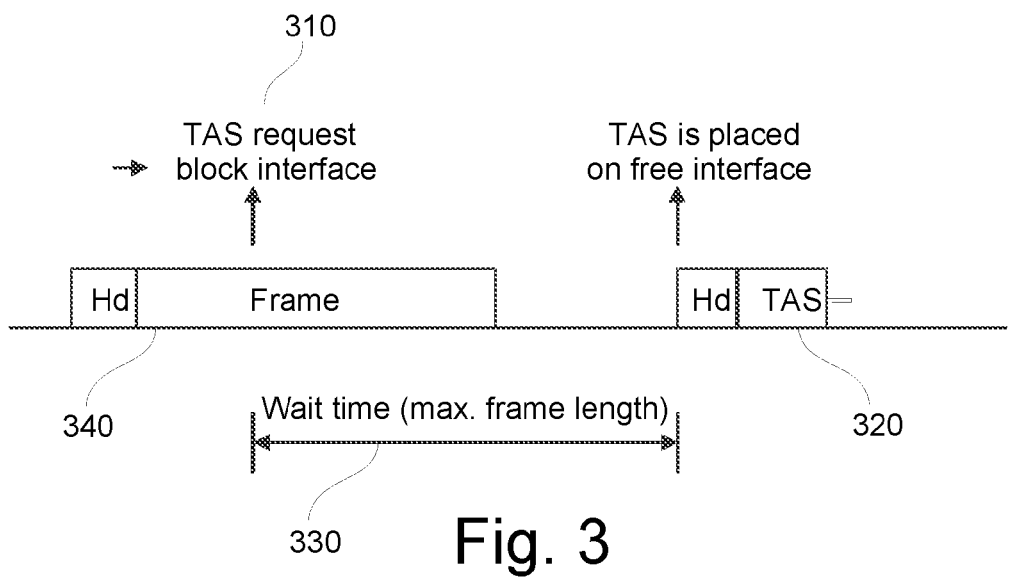
FIG. 3 illustrates TAS management according to an exemplary embodiment of the first aspect.

FIG. 3 shows that a frame 340 including a header portion (Hd) and a payload portion is transmitted over the DigRF interface. Upon receipt of a TAS request 310, the corresponding interface is blocked and a waiting time 330 is started. The length of the waiting time 330 may equal to a length of the frame 340. The TAS message 320 is then placed on the free interface only after expiry of the waiting time 330 to be sure that the interface is free. Hence, if the TAS message 320 shall be sent all other requests are blocked for the waiting time 330 equal to the transmission time of maximum sized frame 340 (512 bit). After this waiting time 330 the compliance layer 130 can be sure that the interface is not loaded. Now the TAS message 320 is transmitted over the interface with latency as constant as possible.

What concerns the TAS payload, the compliance layer in BBIC allows only usage of 8-bit TAS payload, although in DigRF v3 also 32-bit would be supported. The compliance layer will only accept 8-bit TAS payload, what is a negligible restriction to the DigRF v3 standard on BBIC. The compliance layer in RFIC shall support reception of TAS payload of 8 and 32 bit. In case of 32-bit payload only the msbs are delivered from the compliance layer. The 24 lsbs are stored in a register.

DigRF v3 ICLC (Interface Control Logical Channel) supports only 8-bit payload, whereas in DigRF v4 16-bit payload are supported. The compliance layer shall deliver 16-bit and fill up the least significant bits (lsbs) with zeros.

In an embodiment, an RFIC with DigRF v3 and v4 can support a BBIC with implemented DigRF v3, or can support BBICs with implemented DigRF v4 whereas only software support for DigRF v4 on RFIC is necessary. A DigRF v3 BBIC should additionally implement a compliance layer which does not restrict the standard compliance and which can be implemented purely in software.

Figure 4:
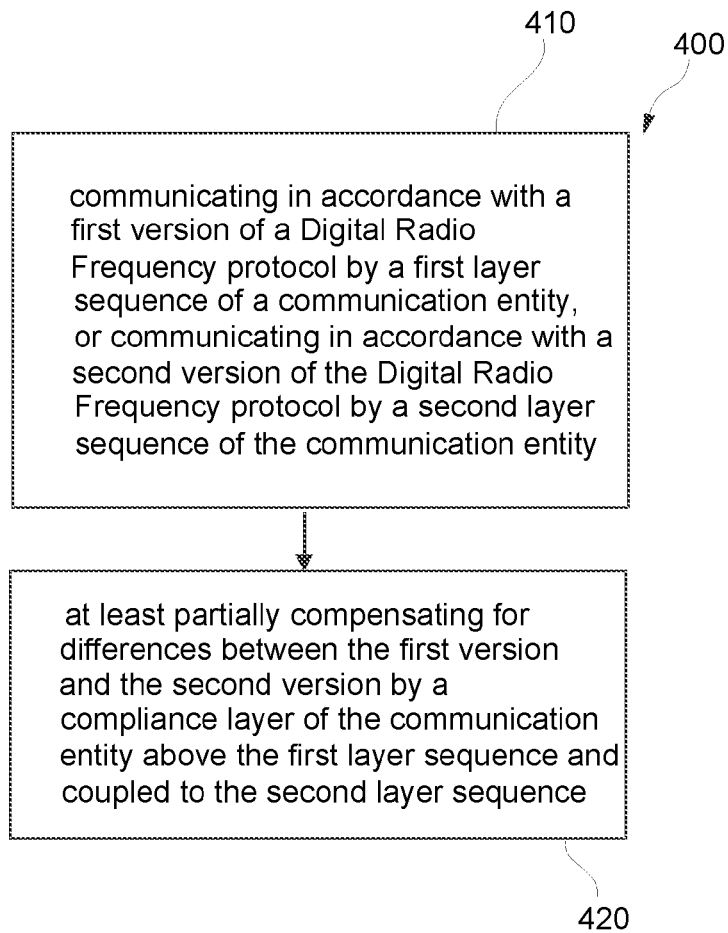
FIG. 4 illustrates a flow diagram of a method according to an exemplary embodiment of the first aspect.

FIG. 4 illustrates a procedure 400 of operating communication entity 100 of FIG. 1 according to an exemplary embodiment of the first aspect of the invention.

Procedure 410 includes communicating in accordance with the first version of the Digital Radio Frequency protocol by the first layer sequence 110 of communication entity 100, or communicating in accordance with the second version of the Digital Radio Frequency protocol by the second layer sequence 120 of the communication entity 100 Procedure 420 includes at least partially compensating for differences between the first version and the second version by the compliance layer 130 of the communication entity 100 above the first layer sequence 110 and coupled to the second layer sequence 120.

In the following, embodiments implementing a Protocol-Physical-Interface (PPI) according to the second aspect of the invention will be explained in more detail.

Figure 5:
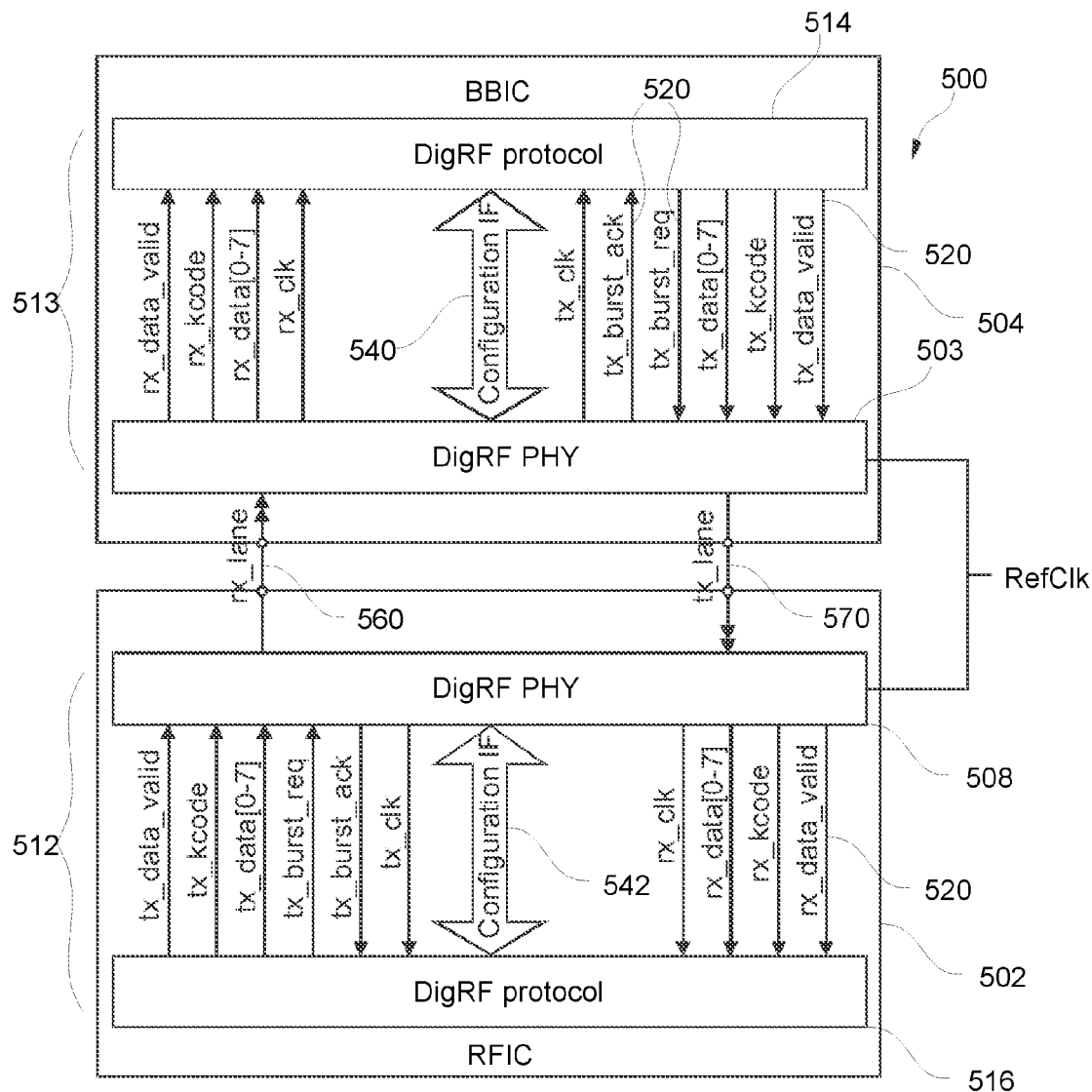
FIG. 5 illustrates a block diagram with a protocol-physical interface of an RFIC and a BBIC in separate packages according to an exemplary embodiment of the second aspect.

FIG. 5 illustrates a communication device 500 according to an exemplary embodiment of the second aspect of the invention which shows a coupling of an RFIC 502 with a BBIC 504. The BBIC 504 comprises a physical layer 503 and a protocol layer 514. The RFIC 502 also comprises a protocol layer 516 and a physical layer 508. The physical layers 503, 508 are coupled to one another by a receiver lane 560 and by a transmission lane 570. Furthermore, a configuration interface 540 is arranged between the physical layer 503 and the protocol layer 514, and a configuration interface 542 is arranged between the physical layer 508 and the protocol layer 516. The configuration interfaces 540, 542 form part of a physical-protocol layer interface (PPI) 512, 513.

FIG. 5 shows the scenario with DigRF protocol layers 514, 516 and physical layers 503, 508 together with rx_lane and tx_lane interfaces 560, 570 between RFIC 502 and BBIC 504 and interfaces 512, 513 comprising several handshake signal lines 520 between DigRF protocol and DigRF PHY in RFIC 502 and BBIC 504. These interfaces, particularly tx and rx interfaces and handshake signal lines 520, are explained in the following sections in more detail.

FIG. 6 schematically illustrates in a scheme 600 the time dependence of the various signals in the interfaces 512, 513 of the transmission path of the communication device 500. With regard to the Tx lane interface, the interface from the protocol to each tx lane includes at least the following lines for data transmission:

tx_clk: free-running clock, ⅒ of the PHY output clock, may e.g. be 2.6, 124.8 or 145.6 MHz in case of DigRF v4 tx_data[0-7]: protocol out, 8 lines for transmitting one 8-bit word in parallel tx_kcode: protocol out, 1 line for indicating whether the current 8-bit word is a k-code or a d-code (only needed for DigRF v4)

tx_burst_req: protocol out, 1 line requesting a burst from the PHY; if signal goes high PHY is inserting prepare and sync sequence, signal goes low after EOT was transmitted.

tx_burst_ack: protocol in, 1 line acknowledge the preparation of the burst, on next clock the first data word shall be provided tx_data_valid: this line is redundant but can be used if protocols are connected directly FIG. 7 schematically illustrates in a scheme 700 the time dependence of the various signals in the interfaces 512, 513 of the receiver path of the communication device 500. With regard to the Rx lane interface, the interface from the protocol to each rx lane includes at least the following lines for data transmission:

rx_clk: gated clock which is output if burst is received; clock synchronized to the 8b10b symbol boundaries; additional clock cycles after EOT rx_data[0-7]: protocol in, 8 lines for transmitting one 8-bit word in parallel rx_kcode: protocol in, 1 line for indicating whether the current 8-bit word is a k-code or a d-code (only needed for DigRF v4)

rx_data_valid: protocol in, 1 line requesting a burst from the PHY; if signal goes high PHY is inserting prepare and sync sequence, signal goes low after EOT was transmitted.

As can be taken from the embodiment of FIG. 5 to FIG. 7, the protocol-physical interface 512, 513 is adapted for providing four handshake signals transmitted via corresponding handshake signal lines 520 capable of connecting the protocol layers 514, 516 via the physical layers 503, 508. The handshake signals comprise a signal tx_data_valid and a signal rx_data_valid which are indicative of a timing of a frame to be transmitted. The handshake signals further comprise a signal tx_burst_req requesting a burst and an opposite signal tx_burst_ack acknowledging a burst.

Figure 8:
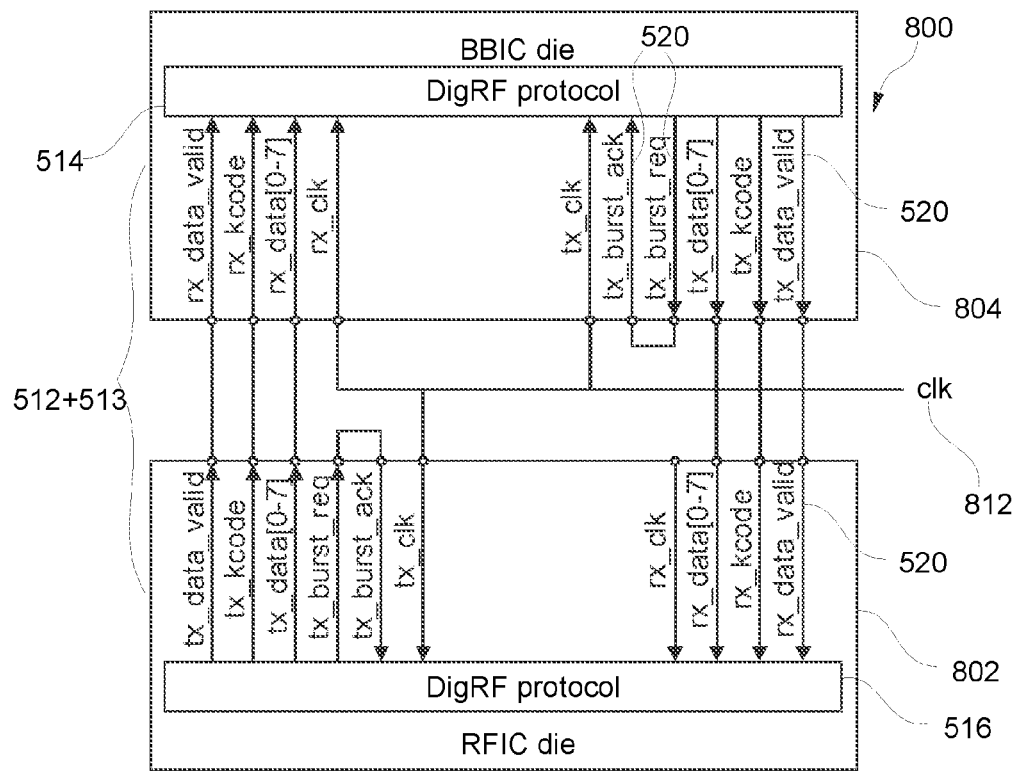
FIG. 8 illustrates a communication device with a direct connection of protocols in a scenario in which physical layers are removed in case of single package deployment of two communication entities according to an exemplary embodiment of the second aspect.

FIG. 8 shows a communication device 800 according to an exemplary embodiment of the second aspect of the invention with a direct connection between protocol layers 514, 516. Communication device 800 has communicatively coupled RFIC die 802 and BBIC die 804. FIG. 8 uses the same protocol-physical interface 512, 513 as FIG. 5, but has another way of coupling the corresponding signal lines, particularly another way of coupling the handshake signal lines 520. This shows that the smart configuration of the protocol-physical interface 512, 513 supports both a direct protocol layer coupling scheme (FIG. 8) or an indirect protocol layer coupling scheme using physical layers 503, 508 (FIG. 5).

In FIG. 8, physical layers are omitted in both the BBIC die 804 and the RFIC die 802. In contrast to this, protocol layer 514 of the BBIC die 804 and protocol layer 516 of the RFIC die 802 are directly coupled via physical-protocol layer interface 512, 513. The various lines of physical-protocol layer interface 512, 513 are explained above referring to FIG. 5 to FIG. 7. In the embodiment of FIG. 8, the BBIC die 804 and the RFIC die 802 may be housed in a common package and may be provided as separate dies (as shown in FIG. 8) or as one common die.

In case of the RFIC die 802 and the BBIC die 804 being integrated in the same package, the protocol parts of the BBIC die 804 and RFIC die 802 can be directly connected as shown in FIG. 8 in a very easy way without any additional logic needed. The physical layers can be removed in RFIC die 802 and BBIC die 804, which saves area and power consumption.

The physical-protocol layer interface 512, 513 is provided with a clock 812, whereas any clock frequency, e.g. up to 145.6 MHz, can be used. As the actual frequencies being provided by the physical layer, which is normally delivering this frequency, can be either 2.6, 124.8 or 145.6 MHz, it is assured that a maximum frequency of 145.6 MHz must be supported by the protocol and can thus be employed. Of course, higher frequencies can be employed by clock 812 if it is assured that the protocol respectively the used hardware can work with it. Further, the clock frequency delivered by the physical layer is asynchronous to the protocol internal clock, i.e. different parts of the system work with different clock frequencies, so there is anyway a clock domain crossing stage.

Coming back to the coupling of the handshake signals in FIG. 8, the protocol-physical interface 512, 513 is adapted for providing the four handshake signals transmitted via handshake signal lines 520 capable of connecting the protocol layers 514, 516 directly to one another, i.e. without physical layers 503, 508. The handshake signal tx_burst_req requesting the burst and the opposite handshake signal tx_burst_ack acknowledging the burst are short-circuited to be directed from protocol layer 514 back to the same protocol layer 514. Furthermore, the signal tx_data_valid in transmission direction and the signal rx_data_valid in receiving direction which are indicative of the timing of the frame are directed from protocol layer 514 to the other protocol layer 516. Hence, a simple re-arrangement of the handshake signal lines 520 in comparison with FIG. 5, without changing the protocol-physical interface 512, 513, is sufficient to operate the protocol-physical interface 512, 513 without physical layers 503, 508. Thus, a direct connection of the protocol layer 514 to the other protocol layer 516 is made possible without the need to change the protocol or a driver software, thanks to the smart design of the protocol-physical interface 512, 513, particularly of the handshake signal lines 520 thereof. The protocol-physical interface 512 is designed to meet the requirements of both a coupling of protocol layers 514, 516 directly or via physical layers 503, 508.

Figure 9:
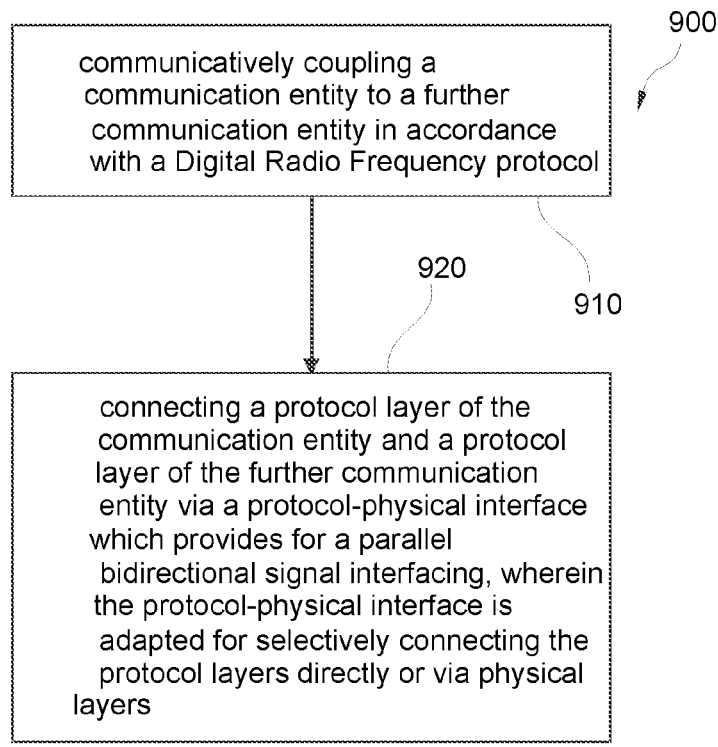
FIG. 9 illustrates a flow diagram of a method according to an exemplary embodiment of the second aspect.

FIG. 9 illustrates a procedure 900 of operating a communication device of FIG. 5 or FIG. 8 according to an exemplary embodiment of the invention.

Procedure 910 includes communicatively coupling communication entity 502 to further communication entity 504 in accordance with a Digital Radio Frequency (DigRF) protocol. Procedure 920 includes connecting protocol layer 516 of the communication entity 502, 802 and protocol layer 514 of further communication entity 504, 804 via protocol-physical interface 512, 513 which provides for a parallel bidirectional signal interfacing. The protocol-physical interface 512, 513 is adapted for selectively connecting the protocol layers 514, 516 directly (see FIG. 8) or via physical layers 503, 508 (see FIG. 5).

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A communication entity for communicating with a further communication entity selectively in accordance with a first version of a Digital Radio Frequency (DigRF) standard or in accordance with a second version of the DigRF standard, the communication entity comprising:
a first layer sequence adapted for communicating in accordance with the first version of the DigRF standard;
a second layer sequence adapted for communicating in accordance with the second version of the DigRF standard;
a compliance layer above the first layer sequence, coupled to the second layer sequence, and being adapted for at least partially compensating for differences between the first version and the second version, and wherein the compliance layer is adapted to map signals propagating from at least one upper layer of the second layer sequence via the compliance layer towards the first layer sequence so that the mapped signals appear to the first layer sequence as signals in accordance with the first version.

2. The communication entity according to claim 1, wherein the compliance layer is adapted to provide a logical interface to a programming model layer of the second layer sequence which logical interface is identical to an interface between a protocol layer and the programming model layer of the second layer sequence.

3. The communication entity according to claim 1, wherein the compliance layer is adapted to provide logical channels to a programming model layer of the second layer sequence which logical channels are equivalent to logical channels provided by a protocol layer of the second layer sequence.

4. The communication entity according to claim 1, wherein the compliance layer is adapted to adjust a frame length of signals propagating from the second layer sequence via the compliance layer to the first layer sequence to render the frame length compatible with the first version.

5. The communication entity according to claim 4, wherein the compliance layer is adapted to adjust the frame length by adding one or more fill bits to the signal to extend the frame length to a length which is compatible with the first version.

6. The communication entity according to claim 5, wherein the compliance layer is adapted to add information to a header of the signal indicative of a number of added fill bits.

7. The communication entity according to claim 1, wherein the compliance layer is adapted to segment a signal propagating from the second layer sequence via the compliance layer to the first layer sequence into a plurality of separate frames to render a frame length compatible with a maximum frame length supported by the first version.

8. The communication entity according to claim 1, wherein the compliance layer is adapted to, in the event of a time accurate strobe (TAS) request, delay a transmission of a TAS message by a time interval which is equal to or larger than a transmission time of a frame having a predefined maximum frame length.

9. A method of communicating between communication entities selectively in accordance with a first version of a Digital Radio Frequency (DigRF) standard or in accordance with a second version of the DigRF standard, the method comprising:
communicating in accordance with the first version of the DigRF standard using a first layer sequence;
communicating in accordance with the second version of the DigRF standard using a second layer sequence; and
compensating differences between the first version and the second version using a compliance layer provided above the first layer sequence and coupled to the second layer sequence by mapping signals propagating from at least one upper layer of the second layer sequence via the compliance layer towards the first layer sequence so that the mapped signals appear to the first layer sequence as signals in accordance with the first version.

10. The method according to claim 9, further comprising providing a logical interface to a programming model layer of the second layer sequence using the compliance layer, wherein the logical interface is identical to an interface between a protocol layer and a programming model layer of the second layer sequence.

11. The method according to claim 9, further comprising providing logical channels to a programming model layer of the second layer sequence using the compliance layer, wherein the logical channels are equivalent to logical channels provided by a protocol layer of the second layer sequence.

12. The method according to claim 9, wherein compensating differences between the first version and the second version comprises adjusting a frame length of signals propagating from the second layer sequence via the compliance layer to the first layer sequence to render the frame length compatible with the first version.

13. The method according to claim 12, wherein adjusting the frame length comprises adding one or more fill bits to the signal to extend the frame length to a length which is compatible with the first version.

14. The method according to claim 13, wherein compensating differences between the first version and the second version comprises adding information to a header of the signal indicative of a number of added fill bits.

15. The method of claim 9, wherein compensating differences between the first version and the second version comprises segmenting a signal propagating from the second layer sequence via the compliance layer to the first layer sequence into a plurality of separate frames to render a frame length compatible with a maximum frame length supported by the first version.

16. The method of claim 9, further comprising, in the event of a time accurate strobe (TAS) request, delaying a transmission of a TAS message by a time interval which is equal to or larger than a transmission time of a frame having a predefined maximum frame length.

* * * * *